United States Patent
Wu

(10) Patent No.: US 11,665,326 B2
(45) Date of Patent: May 30, 2023

(54) PROJECT SYSTEM AND GAMMA CURVE CORRECTION METHOD

(71) Applicant: Coretronic Corporation, Hsin-Chu (TW)

(72) Inventor: Chia-Keng Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/493,870

(22) Filed: Oct. 5, 2021

(65) Prior Publication Data

US 2022/0150455 A1 May 12, 2022

(30) Foreign Application Priority Data

Nov. 6, 2020 (CN) .......................... 202011228096.9

(51) Int. Cl.
*H04N 9/31* (2006.01)
*G03B 21/14* (2006.01)

(52) U.S. Cl.
CPC ......... *H04N 9/3182* (2013.01); *H04N 9/3152* (2013.01); *H04N 9/3191* (2013.01); *H04N 9/3197* (2013.01); *G03B 21/142* (2013.01)

(58) Field of Classification Search
CPC .. H04N 9/3152; H04N 9/3155; H04N 9/3158; H04N 9/3182; H04N 9/3191; H04N 9/3197; G03B 21/28; G03B 21/142; G03B 21/147; G03B 21/208; G03B 21/2053

See application file for complete search history.

(56) References Cited

U.S. PATENT DOCUMENTS

| | | | | |
|---|---|---|---|---|
| 2005/0103976 | A1* | 5/2005 | Ioka | H04N 5/74 348/E17.005 |
| 2016/0050402 | A1* | 2/2016 | Jeong | H04N 9/69 348/674 |
| 2016/0351165 | A1* | 12/2016 | Chang | G06F 3/04842 |
| 2017/0116956 | A1* | 4/2017 | Yang | G09G 5/10 |
| 2019/0335146 | A1* | 10/2019 | Hisano | H04N 9/3182 |

FOREIGN PATENT DOCUMENTS

CN 103929604 3/2017

* cited by examiner

*Primary Examiner* — Sultan Chowdhury
(74) *Attorney, Agent, or Firm* — JCIPRNET

(57) ABSTRACT

The disclosure provides a projection system and a gamma curve correction method. The projection system includes a projection target and a projection device. A test image is projected on the projection target. The projection device obtains a first gamma curve of the test image by receiving the test image projected on the projection target or sensing a light beam of the projected test image, and judges whether multiple difference values between the first gamma curve and a preset gamma curve is larger than a preset value. The first gamma curve is corrected to generate a second gamma curve when at least one of the difference values is larger than the preset value. The projection system and the gamma curve correction method of the disclosure provides an ideal gamma curve according to the output performance of the use situation.

12 Claims, 10 Drawing Sheets

PROJECT SYSTEM AND GAMMA CURVE CORRECTION METHOD

CROSS-REFERENCE TO RELATED APPLICATION

This application claims the priority benefit of China application serial no. 202011228096.9, filed on Nov. 6, 2020. The entirety of the above-mentioned patent application is hereby incorporated by reference herein and made a part of this specification.

BACKGROUND

1. Field of the Disclosure

The disclosure relates to a projection system and a correction method, and more particularly to a projection system and a gamma curve correction method that provide a curve correction function according to a use situation.

2. Description of Related Art

In recent years, the market share of high-end projectors has become higher and higher, and relative specification requirements have also increased. Only advanced professional specifications may be favored by consumers. In particular, the edge blending of the projection image of the projector is one of the most important specifications of high-end projectors. As the projection requirements of professional large screen systems continue to be raised, two or more projectors are combined to project on the large screen. The combination methods include horizontal arrangement, vertical arrangement, and array arrangement, and the edge fusion of the projection image is adopted to realize the splicing projection of super large images. There will be some overlap between the images projected by any two projectors, and the main function of edge blending is to adjust the representation of the overlapped part to be consistent, such that the overlapped image is completely invisible on the entire image.

However, the projector in different modes, such as digital imaging and communications in medicine (DICOM) mode, presentation mode, video mode, 3D mode, or the like, also have corresponding different gamma specifications. Taking FIG. 1A and FIG. 1B as an example, a preset gamma curve GMD is an ideal gamma 2.2 curve. A gamma curve C1 is the gamma curve measured in the video mode. A gamma curve C2 is the gamma curve measured in the presentation mode. It can be seen from FIG. 1A and FIG. 1B that when a normalized input brightness NI_in exceeds 50%, a normalized output brightness NI_out and a gamma value GV of the gamma curve C1 and the gamma curve C2 gradually deviate from the preset gamma curve GMD, which will seriously affect the projection image quality of the projector. The above results will cause the projection image observed by the user to be less than realistic, and the details of the dark field cannot be highlighted. In addition, when the current projector cannot provide an ideal gamma curve, the overlapping parts of the splicing images will inevitably have display differences, and edge fusion is difficult to be achieved.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides a projection system and a gamma curve correction method, which provides an ideal gamma curve according to the output performance of the use situation.

The other objectives and advantages of the disclosure may be further understood from the technical features disclosed in the disclosure.

In order to achieve one or part or all of the above objects or other objects, an embodiment of the disclosure provides a projection system. The projection system includes a projection target and a projection device. The projection device is configured to project a test image on the projection target. The projection device obtains the first gamma curve through at least one of the following multiple operations: (1) receiving a test image projected on the projection target so as to obtain the first gamma curve of the test image; and (2) sensing the light beam projecting the test image so as to obtain the first gamma curve of the test image. In addition, the projection device also judges whether corresponding multiple difference values between the first gamma curve and the preset gamma curve are larger than a preset value, and when at least one of the multiple difference values is larger than the preset value, corrects the first gamma curve to generate a second gamma curve.

In order to achieve one or part or all of the above objects or other objects, an embodiment of the disclosure provides a gamma curve correction method for a projection device. The gamma curve correction method includes: projecting the test image on the projection target; obtaining the first gamma curve through at least one of the following multiple operations: (1) receiving a test image projected on the projection target so as to obtain the first gamma curve of the test image, and (2) sensing the light beam projecting the test image so as to obtain the first gamma curve of the test image; judging whether the corresponding multiple difference values between the first gamma curve and the preset gamma curve are larger than the preset value; and when at least one of the multiple difference values is larger than a preset value, correcting the first gamma curve to generate a second gamma curve.

Based on the above, the embodiments of the disclosure have at least one of the following advantages or effects. The disclosure obtains the first gamma curve of the test image, compares the first gamma curve with the preset gamma curve, and judges whether to correct the first gamma curve according to the comparison result of the first gamma curve and the preset gamma curve. The disclosure provides a correction gamma curve based on the output of the test image. In this way, the disclosure may provide an ideal gamma curve according to the output performance of the use situation.

Other objectives, features and advantages of the disclosure will be further understood from the further technological features disclosed by the embodiments of the disclosure wherein there are shown and described embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated

DESCRIPTION OF THE EMBODIMENTS

It is to be understood that other embodiment may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 2:
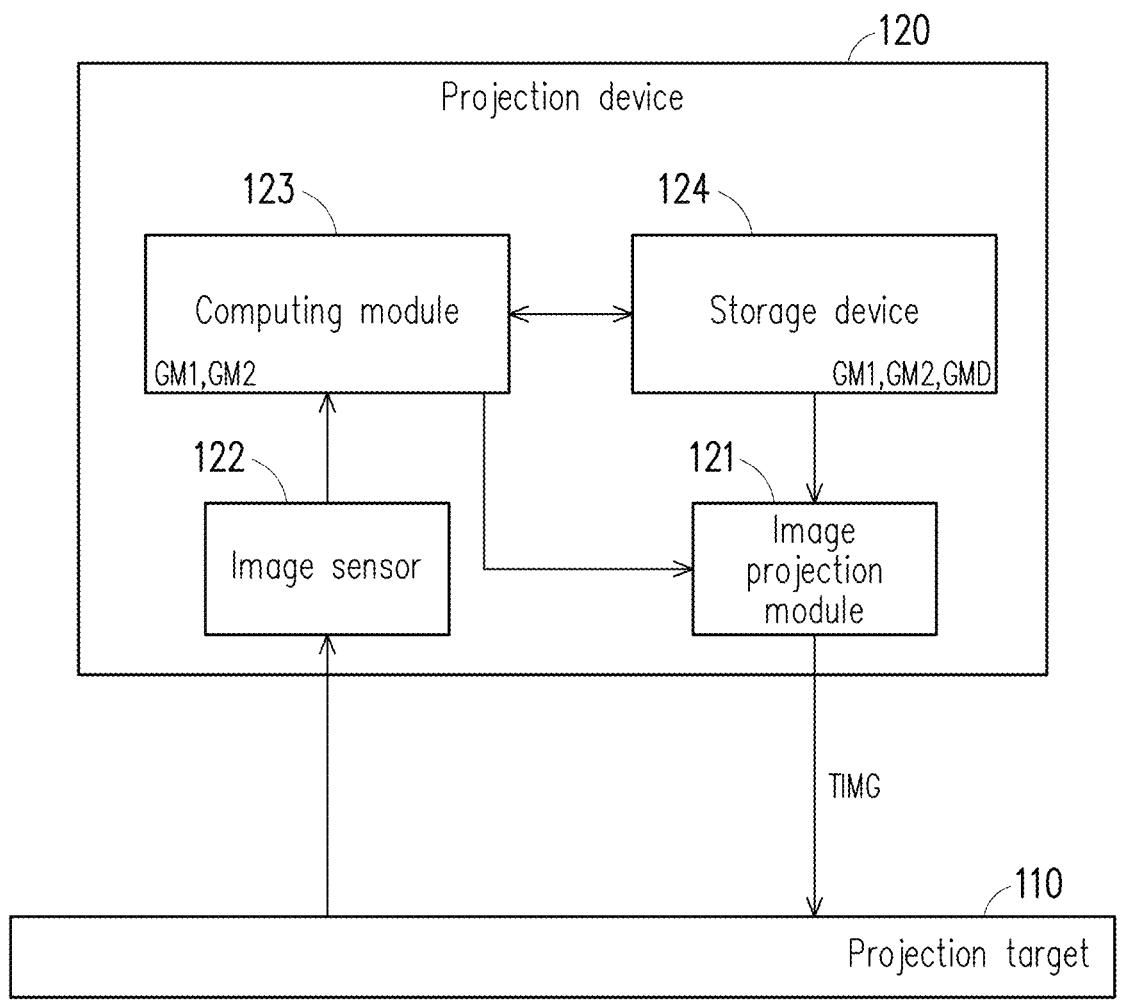
FIG. 2 is a schematic diagram of a projection system according to an embodiment of the disclosure.

Please refer to FIG. 2. FIG. 2 is a schematic diagram of a projection system according to an embodiment of the disclosure. In the embodiment, a projection system 100 includes a projection target 110 and a projection device 120. The projection target 110 may be a projection wall or a projection screen. The projection device 120 provides a test image TIMG, and projects the test image TIMG on the projection target 110. The projection device 120 obtains a first gamma curve GM1 of the test image TIMG. In the embodiment, the projection device 120 receives the test image TIMG projected on the projection target 110 to obtain the first gamma curve GM1 of the test image TIMG. In some embodiments, the projection device 120 senses a light beam projecting the test image TIMG so as to obtain the first gamma curve GM1 of the test image TIMG. In some embodiments, the projection device 120 receives the test image TIMG projected on the projection target 110 and senses the beam of the projected test image TIMG to obtain the first gamma curve GM1 of the test image TIMG.

The projection device 120 compares the first gamma curve GM1 with a preset gamma curve GMD to generate multiple difference values. In the embodiment, the preset gamma curve GMD is a gamma curve that enables the projection device 120 to provide a projection image with ideal (or best) visual effects. In the embodiment, the projection device 120 compares the first gamma curve GM1 with the preset gamma curve GMD based on an input brightness to generate multiple difference values. For ease of explanation, one single projection device 120 is used as an example in the embodiment. The projection device of the disclosure may be one or more, and the disclosure is not limited thereto.

For example, the aforementioned difference values may be gray scale difference values. In this case, the projection device 120 obtains first gray scale values of the first gamma curve GM1 at normalized input brightnesses of 10%, 20%, . . . , 100%, and compares the first gray scale value of the first gamma curve GM1 at the normalized input brightness of 10% with the preset gray scale value of the preset gamma curve GMD at the normalized input brightness of 10%, thereby generating a gray scale difference value corresponding to the normalized input brightness of 10%. The projection device 120 compares the first gray scale value of the first gamma curve GM1 at the normalized input brightness of 20% with the preset gray scale value of the preset gamma curve GMD at the normalized input brightness of 20%, thereby generating a gray scale difference value corresponding to the normalized input brightness of 20%, and so on. Therefore, the projection device 120 may generate multiple gray scale difference values corresponding to the normalized input brightness of 10%, 20% . . . 100%.

For another example, the aforementioned difference values may be gamma difference values. In this case, the projection device 120 obtains first gamma values of the first gamma curve GM1 at the normalized input brightnesses of 10%, 20%, . . . , 100%, and compares the first gamma value of the first gamma curve GM1 at the normalized input brightness of 10% with the preset gamma curve GMD at the preset gamma value (such as 2.2) at the normalized input brightness of 10%, thereby generating a gamma difference value corresponding to the normalized input brightness of 10%. The projection device 120 compares the first gamma value of the first gamma curve GM1 at the normalized input brightness of 20% with the preset gamma value (such as 2.2) of the present curve GMD at the normalized input brightness of 20%, thereby generating a gamma difference value corresponding to the normalized input brightness of 20%, and so on. Therefore, the projection device 120 may generate multiple gamma difference values corresponding to the normalized input brightness of 10%, 20%, . . . 100%.

Figure 1A:
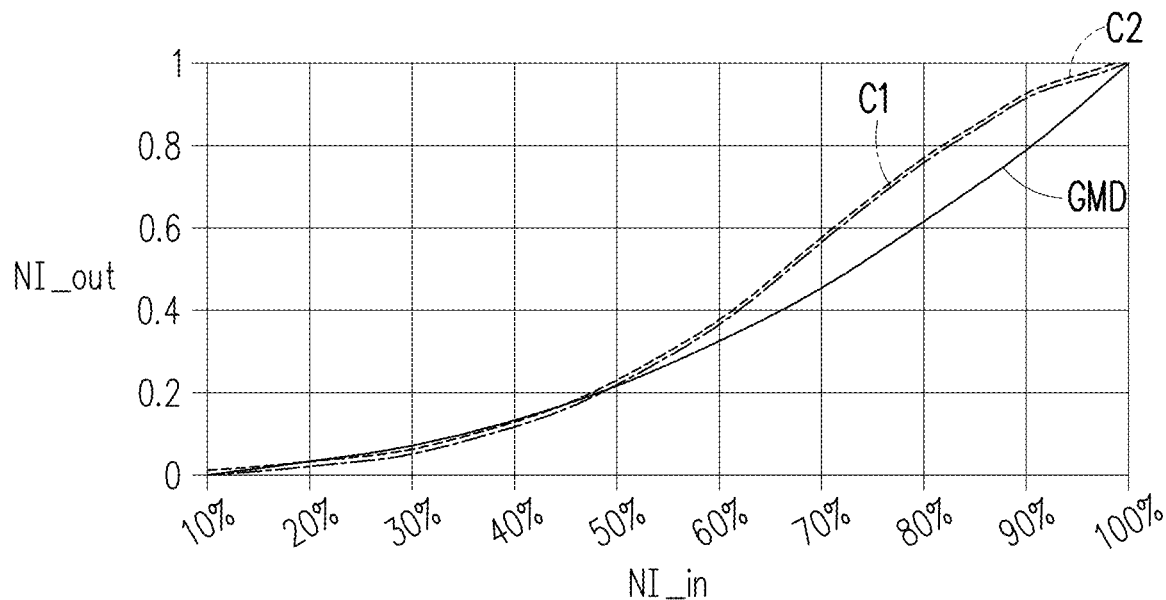
FIG. 1A and FIG. 1B are diagrams of gamma curves of prior art in different modes.
Figure 1B:
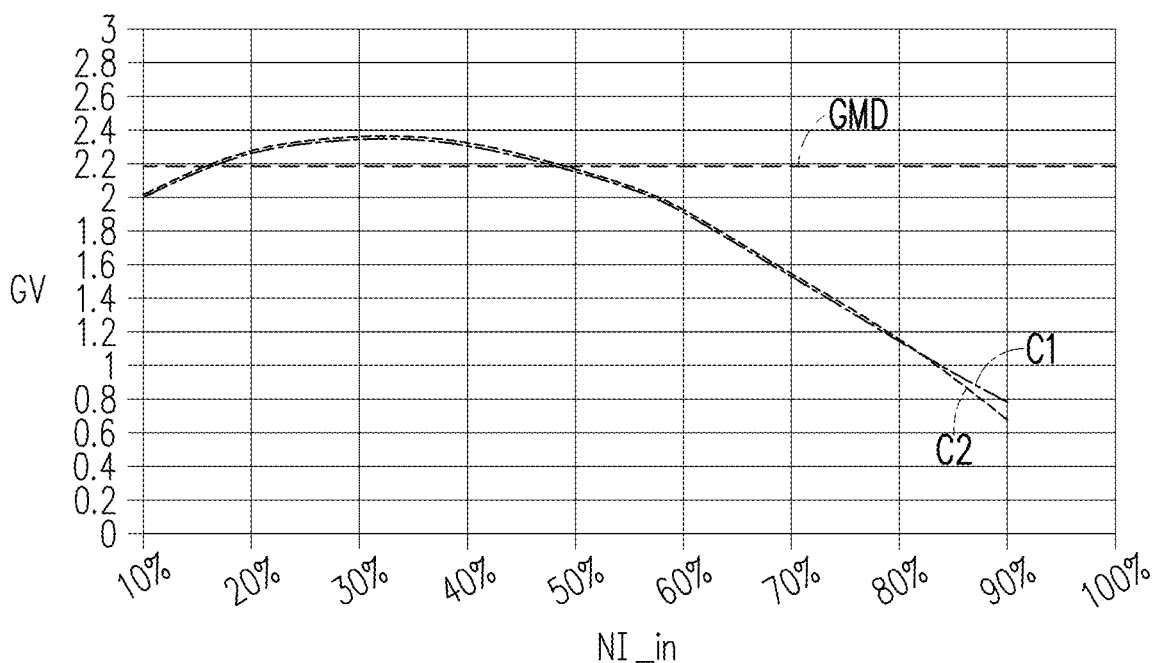

In the embodiment, the projection device 120 judges whether the multiple difference values are larger than a preset value. When at least one of the aforementioned difference values is larger than the preset value, the projection device 120 corrects the first gamma curve GM1 to generate a second gamma curve GM2. For example, the preset value may be set to 5% of the gamma value of the preset gamma curve GMD. In FIG. 1B, the gamma value of the preset gamma curve GMD is fixed at 2.2. Therefore, the preset value is 0.11. At least one of the aforementioned multiple gamma difference values larger than the preset value indicates that the first gamma curve GM1 deviates from the preset gamma curve GMD. Therefore, the projection device 120 corrects the first gamma curve GM1 to generate the second gamma curve GM2. The preset value of the disclosure may be adjusted according to usage requirements, and the preset value of the disclosure is not limited to this embodiment.

On the other hand, when the multiple difference values are less than or equal to the preset value, the first gamma curve GM1 is similar to the preset gamma curve GMD. Therefore, the projection device 120 does not correct the first gamma curve GM1.

It is worth mentioning here that the projection system 100 obtains the first gamma curve GM1 of the test image TIMG, and compares the first gamma curve GM1 with the preset gamma curve GMD, thereby generating multiple difference values, and judges whether to correct the first gamma curve GM1 according to the comparison result of the difference values and the preset value. It may be seen that the projection system 100 provides the corrected first gamma curve GM1 according to the output of the test image TIMG. Thus, the projection system 100 may provide an ideal gamma curve according to the output performance of the use situation.

Incidentally, the projection system 100 may provide an ideal gamma curve according to the output performance of the use situation. Therefore, the projection system 100 can provide an ideal gamma curve in multiple display standards, such as Rec. 709 standard, Rec. 2020 standard, Rec. 2100 standard, DICOM standard, standard dynamic range (SDR) standard, high dynamic range (HDR) standard, hybrid logarithmic gamma standard, or the like. The projection system 100 can also provide an ideal gamma curve in multiple display modes, such as digital imaging and communications in medicine (DICOM) mode, presentation mode, video mode, 3D mode, or the like. Moreover, because the projection system 100 can provide an ideal gamma curve according to the output performance of the use situation, when the projection system 100 includes multiple projection devices 120, for example, it is possible to make the overlapping part generated by image splicing have a consistent representation. Therefore, the projection system 100 may achieve ideal edge fusion, and does not produce the visual illusion of Mach Band Effect.

Continuing to refer to FIG. 2, further, in the embodiment, the projection device 120 may include an image projection module 121, an image sensor 122 and a computing module 123. The image projection module 121 projects the test image TIMG on the projection target 110. In the embodiment, the image sensor 122 obtain the test image TIMG projected on the projection target 110. The computing module 123 is coupled to the image projection module 121 and the image sensor 122. The computing module 123 obtains the first gamma curve GM1 according to the gray scale change or the color scale change of the test image TIMG. In the embodiment, the image sensor 122 may include a video camera or a camera. The projection device 120 compares the first gamma curve GM1 with the preset gamma curve GMD through the computing module 123 so as to generate multiple difference values. The computing module 123 also judges whether the above-mentioned multiple difference values are larger than a preset value. When at least one of the aforementioned difference values is larger than the preset value, the computing module 123 corrects the first gamma curve GM1 to generate the second gamma curve GM2. The computing module 123 may correct the first gamma curve GM1 through the currently known gamma curve adjustment method to generate the second gamma curve GM2. The computing module 123 is, for example, a central processing unit (CPU), or other programmable general-purpose or special-purpose microprocessors, digital signal processors (DSP), programmable controllers, application specific integrated circuits (ASIC), programmable logic device (PLD), or other similar devices or a combination of these devices.

In the embodiment, the projection device 120 further includes a storage device 124. The storage device 124 is, for example, a random access memory (RAM), a read-only memory (ROM), a flash memory, or similar components or a combination of the foregoing components. The storage device 124 is coupled to the computing module 123. The storage device 124 stores the preset gamma curve GMD and the first gamma curve GM1. The image projection module 121 projects the test image TIMG according to the first gamma curve GM1 stored in the storage device 124. For example, the computing module 123 may receive the first gamma curve GM1 stored in the storage device 124, and provide data of the test image TIMG and the first gamma curve GM1 to the image projection module 121. Therefore, the image projection module 121 may project the test image TIMG based on the first gamma curve GM1. For another example, the image projection module 121 may receive the data of the test image TIMG and the first gamma curve GM1 from the storage device 124. Therefore, the image projection module 121 may project the test image TIMG based on the first gamma curve GM1.

In addition, the computing module 123 updates the storage device 124 after generating the second gamma curve GM2, so as to correct the first gamma curve GM1 to the second gamma curve GM2. In this way, the image projection module 121 projects the test image TIMG according to the second gamma curve GM2 stored in the storage device 124.

In the embodiment, the test image TIMG includes at least one of a gray scale image and a color scale image. In addition, the gray scale or the color scale of the test image TIMG varies with the pixel distribution. The image sensor 122 obtains the test image TIMG and the gray scale change or the color scale change of the test image TIMG.

Figure 3A:
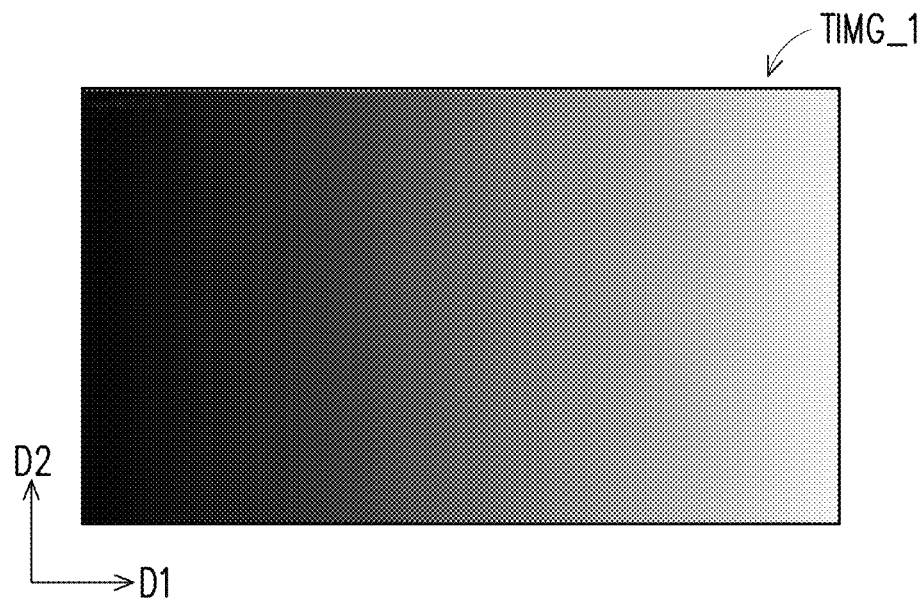
FIG. 3A to FIG. 3E are schematic diagrams of test images according to an embodiment of the disclosure.
Figure 3B:
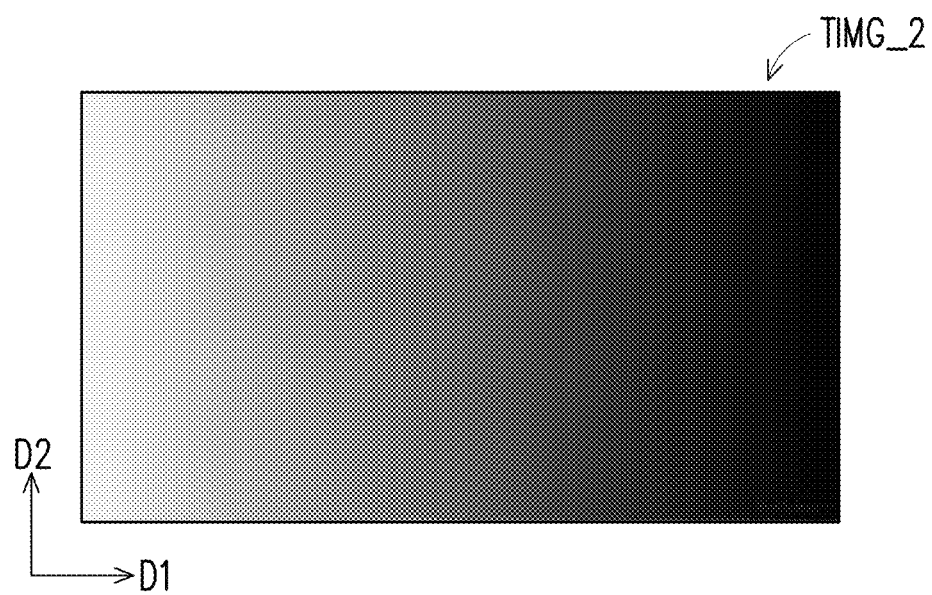
Figure 3C:
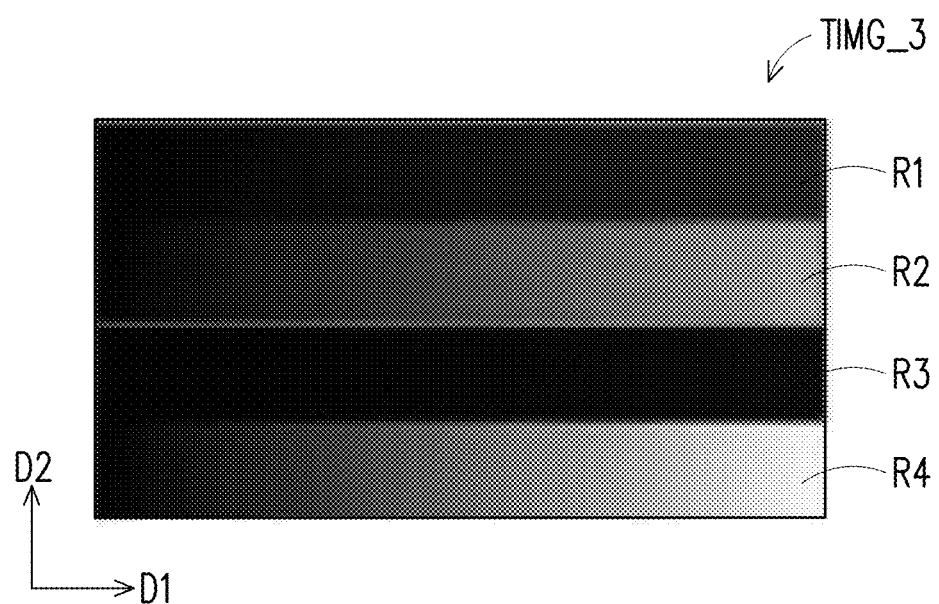
Figure 3D:
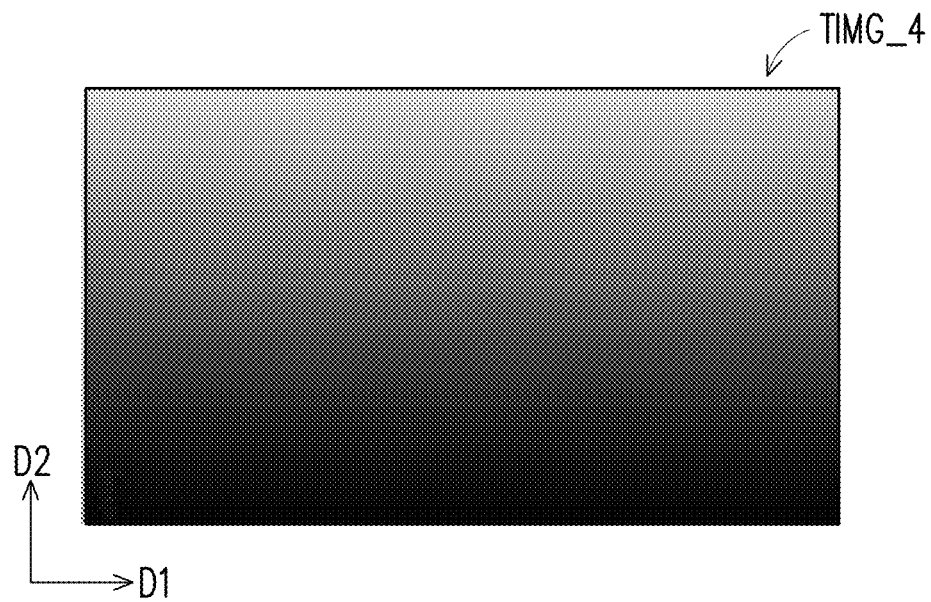
Figure 3E:
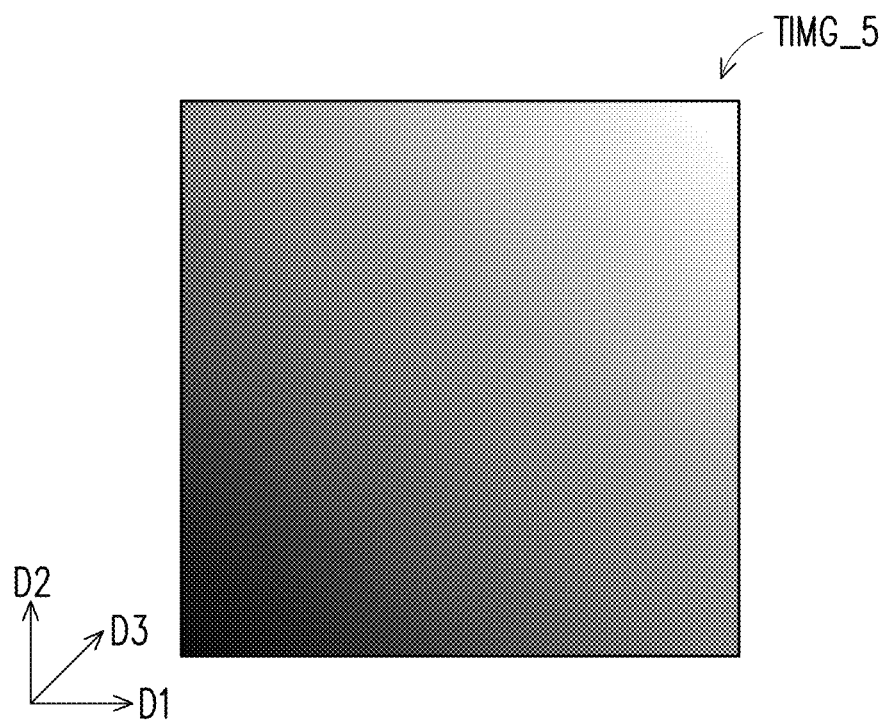
Figure 4:
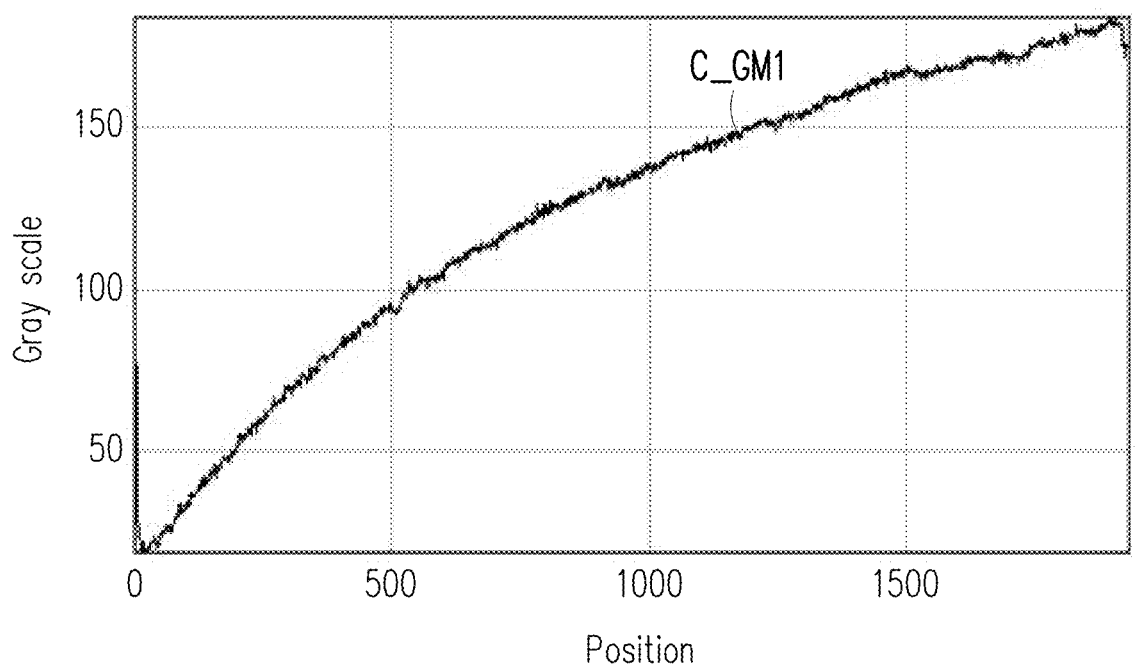
FIG. 4 is a gray scale distribution diagram according to FIG. 3A.

For example, please refer to FIG. 2, FIG. 3A to FIG. 3E, and FIG. 4 at the same time. FIG. 3A to FIG. 3E are schematic diagrams of test images according to an embodiment of the disclosure. FIG. 4 is a gray scale distribution diagram according to FIG. 3A. In the embodiment, FIG. 3A to FIG. 3E respectively illustrate different test images TIMG_1-TIMG_5. In FIG. 3A, the test image TIMG_1 is a gray scale image. The gray scale value of the test image TIMG_1 rises from the lowest gray scale value to the highest gray scale value along a direction D1. The gray scale value of the test image TIMG_1 is constant in a direction D2. Therefore, the image sensor 122 can obtain a test image TIMG_1, and a gray scale change of the test image TIMG_1. The computing module 123 can obtain a gray scale distribution CGM1 shown in FIG. 4 according to the gray scale change of the test image TIMG_1 in the direction D1, thereby obtaining the first gamma curve GM1 of the test image TIMG_1.

In FIG. 3B, the test image TIMG_2 is a gray scale image. The gray scale value of the test image TIMG_2 drops from the highest gray scale value to the lowest gray scale value along the direction D1. The gray scale value of the test image TIMG_2 is constant in the direction D2. Therefore, the image sensor 122 can obtain a test image TIMG_2 and a gray scale change of the test image TIMG_2. The computing module 123 can obtain the first gamma curve GM1 of the test image TIMG_2 according to the gray scale change of the test image TIMG_2 in the direction D1.

In FIG. 3C, the test image TIMG_3 is a color image. The test image TIMG_3 is divided into different areas R1-R4 in the direction D2. For example, the area R1 is a red area. The area R2 is a green area. The area R3 is a blue area. The area R4 is a white area. The image sensor 122 can obtain the test image TIMG_3, and the color scale change of the test image TIMG_3. Color scale values of the areas R1-R4 of the test image TIMG_3 rise from the lowest color scale value to the highest color scale value along the direction D1. The computing module 123 can obtain the first gamma curve GM1 of the test image TIMG_3 according to the color scale change of the test image TIMG_3 in the direction D1.

In FIG. 3D, the test image TIMG_4 is a gray scale image. The gray scale value of the test image TIMG_4 rises from the lowest gray scale value to the highest gray scale value along a direction D2. The gray scale value of the test image TIMG_4 is constant in the direction D1. Therefore, the projection device 120 can obtain the first gamma curve GM1 of the test image TIMG_4 according to the gray scale change of the test image TIMG_4 in the direction D2.

In FIG. 3E, the test image TIMG_5 is a gray scale image. The gray scale value of the test image TIMG_5 rises from the lowest gray scale value to the highest gray scale value along a direction D3. The direction D3 is different from the directions D1, D2 and is not parallel or perpendicular to the directions D1, D2. Therefore, the projection device 120 can obtain the first gamma curve GM1 of the test image TIMG_5 according to the gray scale change of the test image TIMG_5 in the direction D3. The projection device 120 may compare the first gamma curve GM1 of the test image TIMG_5 with the preset gamma curve GMD to generate the multiple difference values, and then correct the first gamma curve GM1 according to the multiple difference values.

In addition, in some embodiments, the gray scale value of the test image may be that the center point of the test image rises from the lowest gray scale value to the highest gray scale value in a radial manner. In some embodiments, the gray scale value of the test image may be that the center point of the test image radiates from the highest gray scale value to the lowest gray scale value.

The projection device 120 may compare the first gamma curve GM1 of one of the test images with the preset gamma curve GMD to generate the multiple difference values, and then the first gamma curve GM1 is corrected according to the multiple difference values. The test images TIMG_1-TIMG_5 may be used for projection image splicing. The above-mentioned multiple test images may also be applied to pincushion projection or barrel projection.

Figure 5:
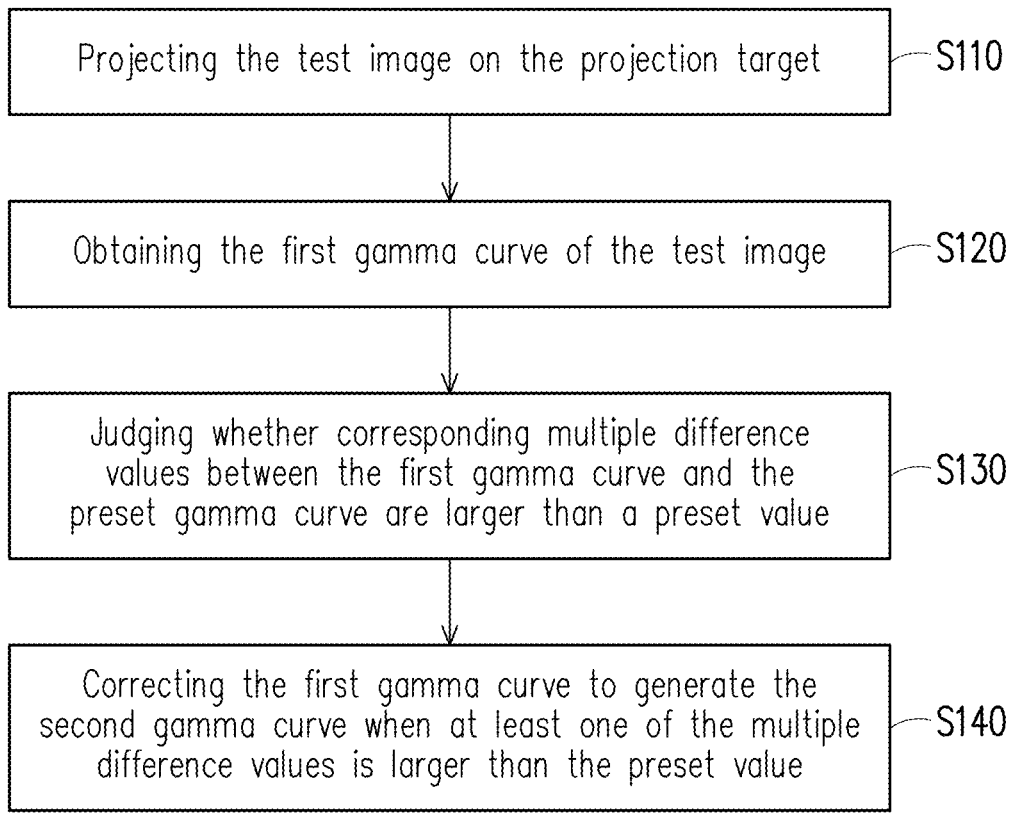
FIG. 5 is a flowchart of a gamma curve correction method according to an embodiment of the disclosure.

Please refer to FIG. 2 and FIG. 5 at the same time. FIG. 5 is a flowchart of a gamma curve correction method according to an embodiment of the disclosure. The gamma curve correction method may be applied to the projection system 100. In step S110, the test image TIMG is projected on the projection target 110. In step S120, the first gamma curve GM1 of the test image TIMG is obtained. In step S130, whether the corresponding multiple difference values between the first gamma curve GM1 and the preset gamma curve GMD are larger than a preset value is judged. In step S140, when at least one of the difference values is larger than the preset value, the first gamma curve GM1 is corrected to generate the second gamma curve GM2. The implementations of steps S110 to S140 may be adequately taught from the multiple embodiments in FIG. 2 to FIG. 4, and therefore will not be repeated here. In the embodiment, the gamma curve correction method may be executed when the projection device 120 is turned on, or may be executed in response to the user's operation on the on-screen display (OSD) interface.

Figure 6:
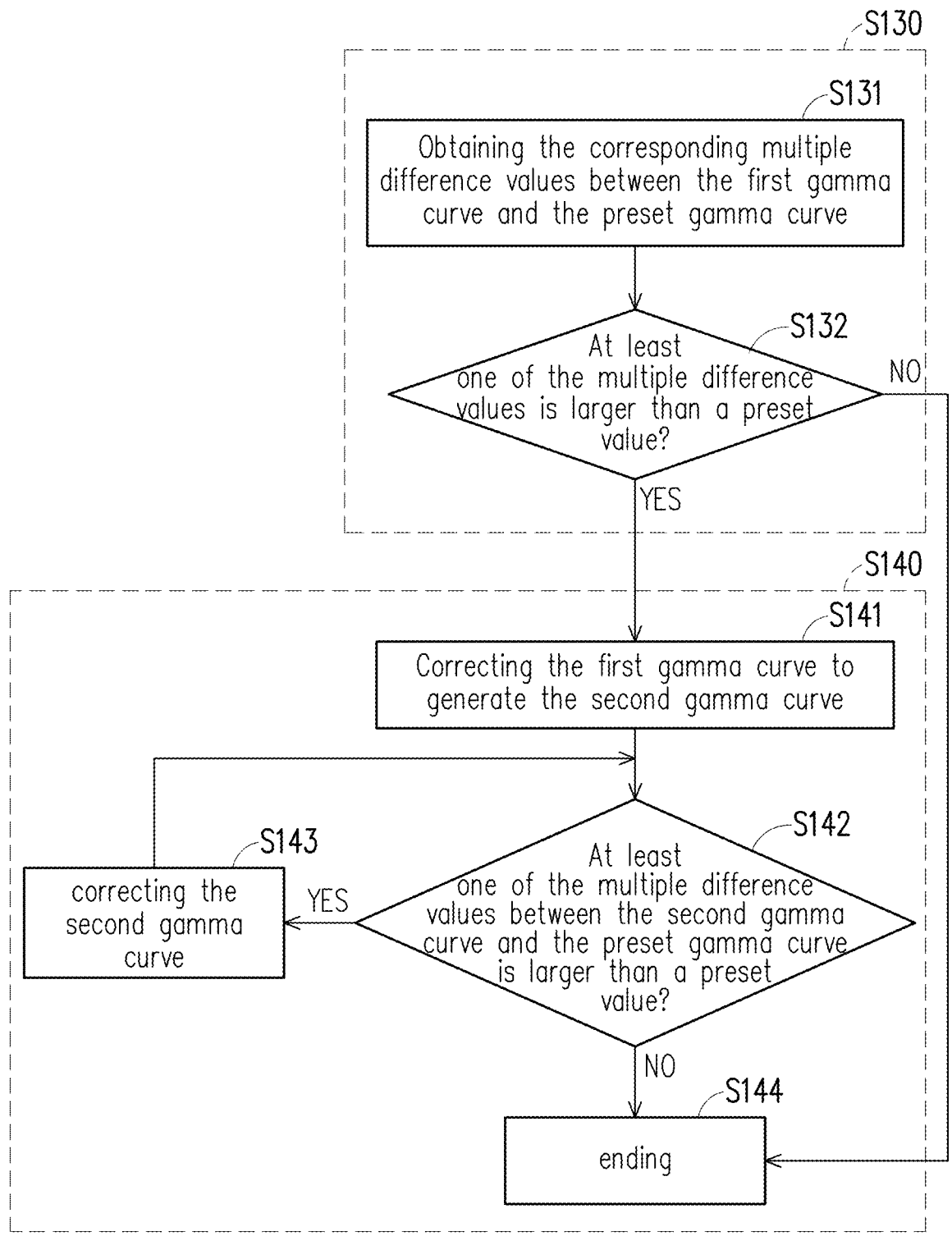
FIG. 6 is a flowchart of a gamma curve correction method shown in steps S130 and S140 of FIG. 5.

The implementation details of steps S130 and S140 are further described. Please refer to FIG. 2 and FIG. 6 at the same time. FIG. 6 is a flowchart of the gamma curve correction method shown in steps S130 and S140 in FIG. 5. Step S130 includes steps S131 and S132. Step S140 includes steps S141 to S144. In step S131, the computing module 123 obtains corresponding multiple difference values between the first gamma curve GM1 and the preset gamma curve GMD. In step S132, the computing module 123 judges that at least one of the difference values is larger than a preset value. When at least one of the multiple difference values is judged to be larger than the preset value in step S132, the computing module 123 corrects the first gamma curve GM1 in step S141 to generate the second gamma curve GM2.

In step S142, the computing module 123 judges whether at least one of the multiple difference values between the second gamma curve GM2 and the preset gamma curve GMD is larger than a preset value. When at least one of the difference values between the second gamma curve GM2 and the preset gamma curve GMD is judged to be larger than the preset value in step S142, the computing module 123 corrects the second gamma curve in step S143 and return to step S142. On the other hand, when multiple difference values between the second gamma curve GM2 and the preset gamma curve GMD are judged to be less than or equal to the preset value in step S142, the gamma curve correction method ends the operation in S144. Namely, the computing module 123 continues to correct the second gamma curve GM2 in steps S142 and S143 until the difference values between the second gamma curve GM2 and the preset gamma curve GMD are less than or equal to the preset value.

Please go back to step S132. When the difference values between the first gamma curve GM1 and the preset gamma curve GMD are judged to be less than or equal to the preset value, the gamma curve correction method ends in step S144.

Figure 7:
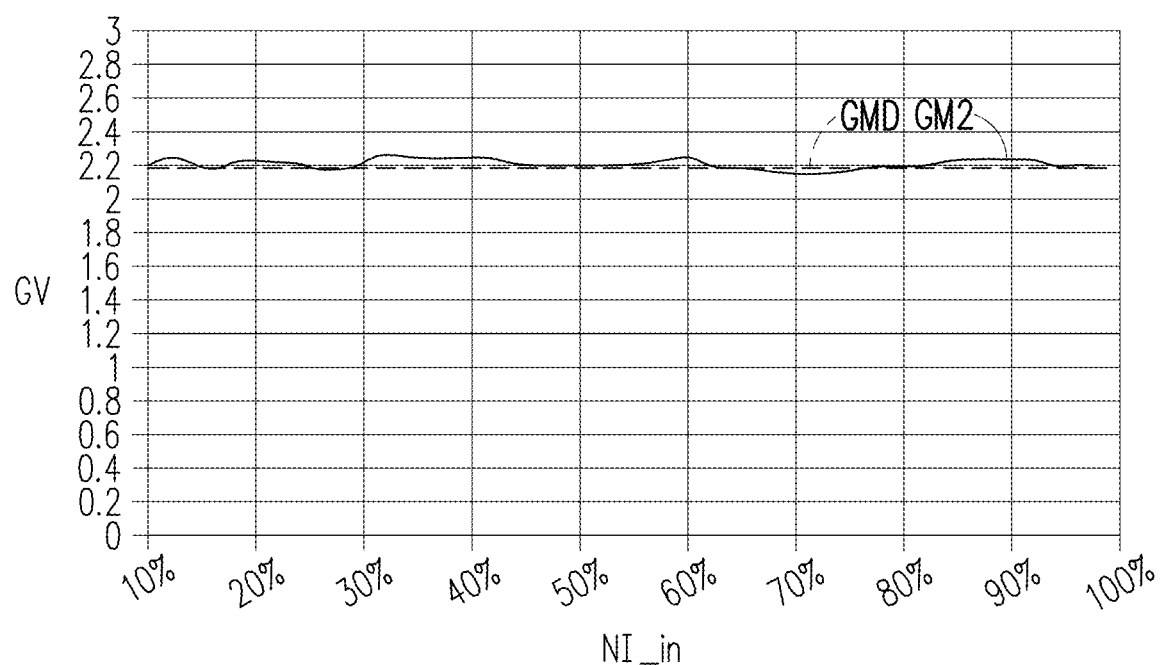
FIG. 7 is a diagram of a corrected gamma curve according to an embodiment of the disclosure.

Please refer to FIG. 7. FIG. 7 is a diagram of a corrected gamma curve according to an embodiment of the disclosure. In the embodiment, multiple difference values between the corrected gamma curve (for example, the second gamma curve GM2 shown in FIG. 7) and the preset gamma curve GMD are all less than or equal to the preset value. Therefore, the corrected gamma curve (for example, the second gamma curve GM2 shown in FIG. 7) is similar to the preset gamma curve GMD.

Figure 8:
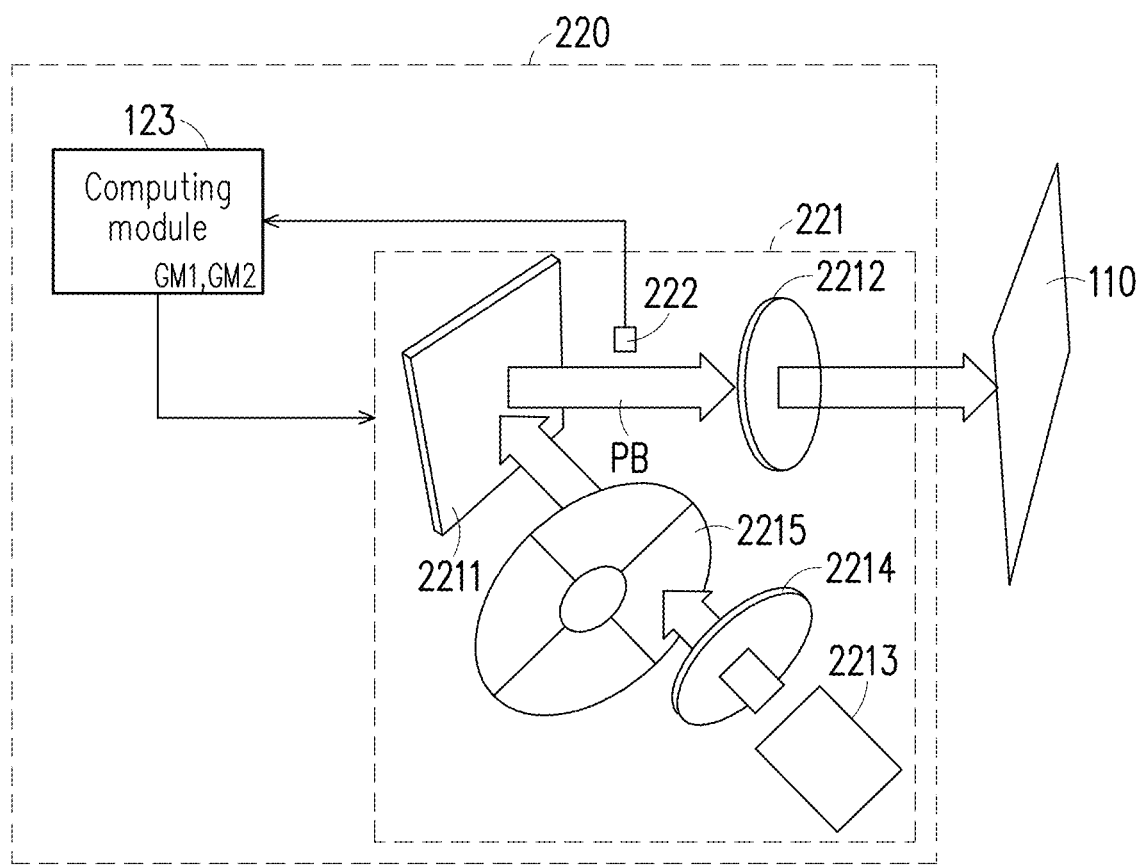
FIG. 8 is a schematic diagram of a projection system according to another embodiment of the disclosure.

Please refer to FIG. 8. FIG. 8 is a schematic diagram of a projection system according to another embodiment of the disclosure. In the embodiment, a projection system 200 includes a projection target 110 and a projection device 220. The projection device 220 includes an image projection module 221, an image sensor 222, and the computing module 123. It should be noted that, compared to the projection system 100 shown in FIG. 2, the image sensor 222 of the projection system 200 is disposed inside the image projection module 221.

For example, a test image (not shown) includes multiple sub-test images having different gray scale values, and each sub-test image is projected sequentially. In other words, each sub-test image is projected sequentially in a time-sharing manner, thereby sequentially providing multiple light beams PB with different brightness values. The image projection module 221 includes a light valve module 2211 and a projection lens 2212. The light valve module 2211 is operated to output multiple light beams PB corresponding to the multiple sub-test images along an optical transmission path. The projection lens 2212 is operated to receive the multiple light beams PB from the light valve module 2211 and to project the multiple light beams PB, thereby forming a test image. In the embodiment, the light valve module 2211 may be a digital micro-mirror device (DMD).

The image sensor 222 may include a light sensor or a brightness sensor disposed between the light valve module 2211 and the projection lens 2212. The image sensor 222 sequentially obtains the multiple brightnesses of the multiple light beams PB. The computing module 123 obtains the first gamma curve GM1 according to the multiple brightnesses obtained by the image sensor 222. Once the computing module 123 judges that at least one of the difference values between the first gamma curve GM1 and the preset gamma curve GMD is larger than the preset value, the computing module 123 corrects the first gamma curve GM1 to generate the second gamma curve GM2. The image projection module 221 provides multiple light beams PB of multiple sub-test images based on the second gamma curve GM2.

For further example, the image projection module 221 further includes a projection light source 2213, a lens 2214, and a color wheel 2215 (the disclosure is not limited thereto). The projection light source 2213 is driven to sequentially project multiple light beams PB corresponding to multiple sub-test images in a time-sharing manner. In addition, the multiple light beams PB pass through the lens 2214 and the color wheel 2215, such that the multiple sub-test images provided by the image projection module 221 respectively have at least one of the different gray scale values and the color scale values. In the embodiment, the projection light source 2213 may be a light source assembly including a bulb, at least one light emitting diode, or at least one laser diode.

In summary, the embodiments of the disclosure have at least one of the following advantages or effects. The disclosure obtains the first gamma curve of the test image, compares the first gamma curve with the preset gamma curve, and judges whether to correct the first gamma curve according to the comparison result of the first gamma curve and the preset gamma curve. The disclosure provides a correction gamma curve based on the output of the test image. In this way, the disclosure may provide an ideal gamma curve according to the output performance of the use situation. The projection system can provide an ideal gamma curve in multiple display standards; Rec. 709 standard, Rec. 2020 standard, Rec. 2100 standard, DICOM standard, standard dynamic range (SDR) standard, high dynamic range (HDR) standard, hybrid log-gamma standard, or the like. The projection system can also provide an ideal gamma curve in multiple display modes, such as digital imaging and communications in medicine (DICOM) mode, presentation mode, video mode, 3D mode, or the like. In addition, because the projection system may provide an ideal gamma curve based on the output performance of the use situation, when the projection system includes multiple projection devices, for example, the overlapping part generated by the splicing of the images may have a consistent representation mode, thereby achieving ideal edge fusion.

The foregoing description of the embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the present disclosure is intended to be dedicated to the public regardless of whether the element or component is explicitly recited in the following claims.

What is claimed is:

1. A projection system, the projection system comprising a projection target and a projection device,
   wherein the projection device is configured to project a test image on the projection target,
   wherein the projection device is configured for
   receiving a test image projected on the projection target, wherein the test image has a gray scale change or a color scale change along a direction from a lowest value to a highest value;
   obtaining a first gamma curve of the test image according to the gray scale change or the color scale change, and
   wherein the projection device judges whether corresponding a plurality of difference values between the first gamma curve and a preset gamma curve are larger than a preset value, and correcting the first gamma curve to generate a second gamma curve when at least one of the plurality of difference values is larger than the preset value.

2. The projection system according to claim 1, wherein the projection device comprises an image projection module, an image sensor, and a computing module, wherein,
   the image projection module is configured to project the test image;
   the image sensor is configured to obtain the test image projected on the projection target, or obtain a light beam configured to project the test image; and
   the computing module is coupled to the image projection module and the image sensor, and is configured to obtain the first gamma curve according to the gray scale change or the color scale change along the direction from the lowest value to the highest value.

3. The projection system according to claim 2, wherein the test image comprises at least one of a gray scale image and a color scale image; a gray scale or a color scale of the test image changes with pixel distribution; and the image sensor comprises a camera, wherein the image sensor is configured to obtain the test image, and the gray scale change or the color scale change of the test image.

4. The projection system according to claim 2, wherein the projection device further comprises a storage device, wherein,
   the storage device is coupled to the computing module and is configured to store the preset gamma curve and the first gamma curve,
   wherein the image projection module projects the test image according to the first gamma curve stored in the storage device.

5. The projection system according to claim 4, wherein,
the computing module updates the storage device when at least one of the plurality of difference values is larger than the preset value, thereby correcting the first gamma curve to the second gamma curve, and the image projection module projects the test image according to the second gamma curve stored in the storage device.

6. The projection system according to claim 1, wherein the preset value is equal to 5% of the gamma value of the preset gamma curve.

7. A gamma curve correction method for a projection device, the gamma curve correction method comprising:

projecting a test image on a projection target;

receiving a test image projected on the projection target, wherein the test image has a gray scale change or a color scale change along a direction from a lowest value to a highest value;

obtaining a first gamma curve of the test image according to the gray scale change or the color scale change;

judging whether corresponding a plurality of difference values between the first gamma curve and a preset gamma curve are larger than a preset value; and correcting the first gamma curve to generate a second gamma curve when at least one of the difference values is larger than the preset value.

8. The gamma curve correction method according to claim 7, wherein:

the projection device comprises an image projection module, an image sensor, and a computing module coupled to the image projection module and the image sensor, and the gamma curve correction method further comprises: the computing module obtaining the first gamma curve according to the gray scale change or the color scale change along the direction from the lowest value to the highest value.

9. The gamma curve correction method according to claim 8, wherein the test image comprises at least one of a gray scale image and a color scale image; a gray scale or a color scale of the test image changes with pixel distribution; and the image sensor comprises a camera, wherein the image sensor is configured to obtain the test image, and the gray scale change or the color scale change of the test image.

10. The gamma curve correction method according to claim 8, wherein:

the projection device further comprises a storage device configured to store the preset gamma curve and the first gamma curve, and the gamma curve correction method further comprises: the image projection module projecting the test image according to the first gamma curve stored in the storage device.

11. The gamma curve correction method according to claim 10, wherein a step of correcting the first gamma curve to generate a second gamma curve comprises:

updating the storage device so as to correct the first gamma curve to the second gamma curve; and controlling the image projection module to project the test image according to the second gamma curve stored in the storage device.

12. The gamma curve correction method according to claim 7, wherein the preset value is equal to 5% of the gamma value of the preset gamma curve.

* * * * *